(12) United States Patent
Kates et al.

(10) Patent No.: US 7,258,614 B1
(45) Date of Patent: Aug. 21, 2007

(54) INTERACTIVE PHOTO GAMING WITH USER RATIFICATION

(75) Inventors: Jesse Kates, Kansas City, MO (US); Robert Brian Landers, Leawood, KS (US); Balaji Thenthiruperai, Overland Park, KS (US); John Everson, Kansas City, MO (US); Jason Delker, Olathe, KS (US); Randy Ulvenes, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 829 days.

(21) Appl. No.: 10/743,487

(22) Filed: Dec. 22, 2003

(51) Int. Cl.
*A63F 9/24* (2006.01)

(52) U.S. Cl. .......................... 463/42; 273/461

(58) Field of Classification Search .................. None
See application file for complete search history.

(56) References Cited

OTHER PUBLICATIONS

Michael Stroud, "*Have Cell Phone, Will Shoot*," Wired News, Feb. 8, 2002, http://216.239.33.100/search?q=cache:p7OwLTtydyMC:www.wired.com/news/wireless/0,1382,50205,00.html+it%27s+alive+botfighters+have+phone+will+shoot&hl=en&ie=UTF-8.

N. Nagaraj, "*Aim your mobile . . . and shoot*," The Hindu Business Line, Internet Edition, Apr. 17, 2002, http://www.thehindubusinessline.com/ew/2002/04/17/stories/2002041700080100.htm.

It's Alive!—Games, "*BotFighters®—the battle is on the streets*," dated at least as early as Apr. 22, 2003, http://www.itsalive.com/page.asp?sa=0&id=1017.

It's Alive!—Games, "*BotFighters: more info*," dated at least as early as Apr. 22, 2003, http://www.itsalive.com/page.asp?id=1075.

It's Alive!—Games, "*BotFighters for Java phones*," dated at least as early as Apr. 22, 2003, http://www.itsalive.com/page.asp?id=1076.

Unwiredfactory—Press, "*The launch of the world's first location based competition*," Jun. 20, 2001, http://www.unwiredfactory.com/press_20010620_1.asp#frame_top_1.

M-business-daily, Voice of the Mobile Economy, "*Update on the money and startups powering the mobile economy: That's Entertainment*," copyright 2002, http://www.mbizcentral.com/magazine/story/new/capital-currents.

IniruWireless—Services, "*Overview*," copyright 2003, dated at least as early as Oct. 27, 2003, http://www.iniru.com/services_overview.jsp.

InirU Wireless—Services, "*Location Based Games*," copyright 2003, dated at least as early as Oct. 27, 2003, http://www.iniru.com/services_games.jsp.

Steven Johnson, "*Geeks Without Borders*," Slate Magazine, Feb. 17, 2003, http://slate.msn.com/id/2078579.

(Continued)

*Primary Examiner*—Mark Sager

(57) ABSTRACT

A mechanism is disclosed for engaging in interactive photo gaming with user ratification. The mechanism can be used to provide a picture-tag game or other games. In a picture-tag game, for instance, a user designated as "IT" tags another user by capturing a photo of the other user. The photo is then transmitted to a game host, which distributes it to the participating players' devices. Upon receipt of the photo, a device presents the photo and prompts a user to acknowledge that the photo represents the user, i.e., that the user has been tagged. The device then sends the acknowledgement to the game host, and the game host notifies the players who is now designated as IT.

31 Claims, 9 Drawing Sheets

OTHER PUBLICATIONS

Wink Back, Inc., The Go Game, "*Homepage*," dated at least as early as Apr. 22, 2003, http://www.thegogame.com.

Wink Back, Inc., The Go Game, "*What Is It?*," dated at least as early as Apr. 22, 2003, http://www.thegogame.com/brownie/game/description/intro.asp.

Wink Back, Inc., The Go Game, "*Are You a Superhero?*," dated at least as early as Apr. 22, 2003, http://www.thegogame.com/brownie/game/description/superhero.asp.

Wink Back, Inc., The Go Game, "*How Can I Play?*," dated at least as early as Apr. 22, 2003, http://www.thegogame.com/brownie/game/description/howtoplay.asp.

Wink Back, Inc., The Go Game, "*How It Works: The Go Game In Action*," dated at least as early as Apr. 22, 2003, http://www.thegogame.com/brownie/game/how/index.asp.

Wink Back, Inc., The Go Game, "*How it Works: Judge For Yourself*," dated at least as early as Apr. 22, 2003, http://www.thegogame.com/brownie/game/how/judging.asp.

Wink Back, Inc., The Go Game, "*How it Works: Online*," dated at least as early as Apr. 22, 2003, http://www.thegogame.com/brownie/game/how/online.asp.

Wink Back, Inc., The Go Game, "*The Game*," dated at least as early as Apr. 22, 2003, http://www.thegogame.com/brownie/game/index.asp.

Wink Back, Inc., The Go Game, "*ATFAQ—Answers To Frequently Asked Questions*," dated at least as early as Apr. 22, 2003, http://www.thegogame.com/brownie/game/faq/index.asp.

Blue Factory, "*Products—MST/Engines: Treasure Hunt Engine*," copyright 2002-2004, dated at least as early as Apr. 22, 2003, http://www.bluefactory.com/web/studio/products.jsp.

NewsDesk 0311, "*CeBIT 2003 (I)—Virtual Mosquito Hunt: An Augmented Reality Game*," Mar. 18, 2003, http://w4.siemens.de/en2/html/press/newsdesk_archive/2003/e_0311_d.html.

Photo to NewsDesk 0311/1, "*Cebit 2003—Virtual Mosquito Hunt*," Mar. 18, 2003, http://w4.siemens.de/en2/html/press/newsdesk_archive/2003/foe03111.html.

Air Combat USA, "*Fighter Pilot for a Day*," copyright 1996-2003, dated at least as early as Apr. 22, 2003, http://www.aircombatusa.com/.

Air Combat USA, "*The most memorable experience of your life*," copyright 1996-2003, dated at least as early as Apr. 22, 2003, http://www.aircombatusa.com/Air_Combat_Brochure.pdf.

Fighter Combat International, "*Got What it Takes to be a 'Top Gun'?*," dated at least as early as Apr. 22, 2003, http://www.fightercombat.com/brochures/aircombat_fci.pdf.

Texas Air Aces™, "*Texas Air Aces: Get Ready! Get Set! Fights On!*," dated at least as early as Apr. 22, 2003, http://www.airaces.com/fight.html.

David Weber, *Field of Dishonor*, Chapter 7, copyright 1994, available at http://www.baen.com/chapters/W200208/0671578200_7.htm.

David Weber, *Field of Dishonor*, Table of Contents, copyright 1994, available at http://www.baen.com/chapters/W200208/0671578200_toc.htm.

David Weber, "*Field of Dishonor: Honor Betrayed*," (book review), dated at least as early as Apr. 22, 2003, http://www.baen.com/chapters/W200208/0671578200_c_.htm.

Bradley University, ECET, "*Datasheet*," copyright 1999, dated Nov. 30, 1999, http://cegt2001.bradley.edu/projects/proj2000/prjteirb/documents/datasheet.html.

Darren Somerville, *Youth Evangelism & Discipleship*, Part One: Youth Evangelism, Chapter 7: "Help Is At My Fingertips!," Section One: "*Books, Seminars and Retreats Oh My!*," dated at least as early as Apr. 22, 2003, http://courses.indwes.edu/KD-YTH371/darren.html.

NewsDesk 0212, "*CeBIT 2002 (II)—Phone, Camera, MP3-Player and Navigation System—All at Your Fingertips*," Mar. 22, 2002, http://w4.siemens.de/en2/html/press/newsdesk_archive/2002/e_0212_d.html.

Photos to NewsDesk 0212/2, "*CeBIT 2002 (II)—Phone, Camera MP3-Player and Navigation System—All at Your Fingertip—Pendant Phone Model A*," Mar. 22, 2003, http://w4.siemens.de/en2/html/press/newsdesk_archive/2002/foe02122.html.

Parent Video Game Review, Pokemon Snap, http://www.gradingthemovies.com/html/games/snap.shtml, printed from the World Wide Web on Apr. 21, 2003.

Gotcha!—Reader Review—GameFAQs, http://www.gamefaqs.com/console/nes/review/R33260.html, "Originally Posted Apr. 16, 2002".

INTERACTIVE PHOTO GAMING WITH USER RATIFICATION

BACKGROUND

1. Field of the Invention

The present invention relates to telecommunications and, more particularly, to network-based gaming. By way of example, the invention can be employed to facilitate a game of tag between users of networked client stations, such as cameraphones for instance.

2. Description of Related Art

In the age-old game of tag, a group of players designates one player as "IT" to start. IT then runs around and tries to tag any other one of the players by touching the other player. When IT successfully tags another player, the tagged player then becomes IT instead and, in turn, runs around and tries to tag one of the players. The game can continue in this manner indefinitely or, more likely, until the players tire.

Many variations on the basic game of tag exist as well. In one variation, for instance, when IT tags another player, the tagged player also becomes IT. The two players then chase and tag the other players, with each tagged player becoming another IT. The game can continue in this manner until one player remains and is deemed the winner. Alternatively, the last person tagged could be deemed IT for the next round of play. Other variations exist as well.

SUMMARY

The present invention is directed in one respect to a method, apparatus and system for engaging in a "picture-tag" game in which a player designated as IT attempts to tag another player by capturing a photo of the other player. The photo is then presented to the players, and, upon viewing the photo, the tagged player acknowledges that he has been tagged, and/or other players acknowledge that the player has been tagged. A networked game host then notifies the players that the tagged player is now IT, and play continues.

According to an exemplary embodiment of the invention, each player will operate a portable gaming device such as a camera that includes a display screen and a network communication interface. A game host may initially select one of the players to be IT, and IT's gaming device may display cross-hairs in a viewfinder or may present some other indication that the player is IT. Each other player's gaming device may then display a photo of IT, so that the players know who is out to get them.

In the exemplary embodiment, when IT captures a photo of another player, IT's gaming device will transmit the photo to the game host, and the game host will transmit the photo to each other player's gaming device, so as to let the players know that IT has purportedly tagged someone.

In accordance with the exemplary embodiment, when a player's gaming device receives the photo from the game host, the gaming device will display that photo and will prompt the player to enter an acknowledgement that the player has been tagged. If the photo depicts the player, then the player would enter an acknowledgement, and the player's gaming device would transmit the acknowledgement to the game host.

Alternatively or additionally, when a player's gaming device receives the photo from the game host, the gaming device could display the photo and prompt the player to specify who the photo represents. For instance, the gaming device could present the player with a menu that lists all of the participating players, and the player could select from the menu the player who is represented by the photo. The gaming device would then transmit an indication of the selected player to the game host. In this manner, the players could effectively vote to acknowledge that a given player has been tagged.

In turn, the game host would notify the players that that tagged player is now IT, and each other player's gaming device would then display a photo of the newly designated IT. Play could then continue in this manner, with the new IT tagging another player by capturing a photo of the other player, and so forth.

The concept of requiring player acknowledgement that a captured photo represents a particular subject (such as a particular player) could be extended to allow for other types of games as well. By way of example, the concept could be extended to allow for a scavenger hunt (or "I spy") game.

In a scavenger hunt game, the game host could send to each participating gaming device a list of items to be found, and the players could search for the items. When a player finds one of the listed items, the player could take a photo of the item, the player's gaming device could send the photo to the game host, and the game host could then send the photo to each player's gaming device. When a player's gaming device receives the photo, the gaming device could display the photo and prompt the player to indicate which item from the list of items is shown in the photo. The player's gaming device could then send to the game host a signal indicating that the photo depicts that item. If the players agree in this manner that the photo shows a particular item, then the game host may flag that item as "found" and may signal to the players' gaming devices to cause the gaming devices to mark the items as found.

These and other aspects and advantages will become apparent to those of ordinary skill in the art by reading the following detailed description, with reference where appropriate to the accompanying drawings. Further, it should be understood that the foregoing summary is merely exemplary and is not intended to limit the scope of the invention as claimed.

DETAILED DESCRIPTION OF AN EXEMPLARY EMBODIMENT

1. Exemplary System

Figure 1:
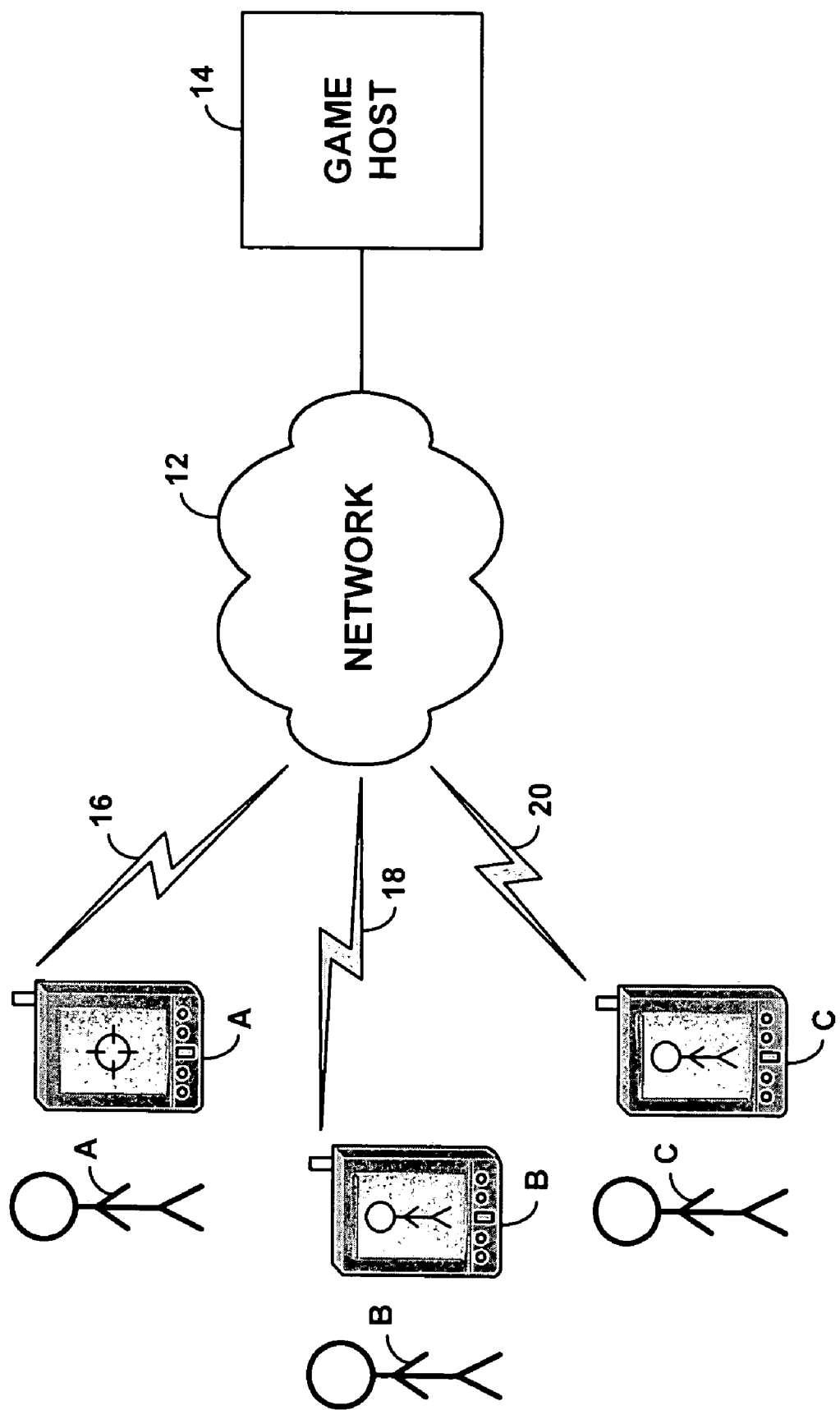
FIG. 1 is block diagram of a system in which the exemplary embodiment can be carried out.

Referring to the drawings, FIG. 1 is a simplified block diagram of a system in which the exemplary embodiment can be carried out. The arrangement of FIG. 1 depicts three players, designated as players A, B and C, each operating a respective gaming device, designated as devices A, B and C. In the exemplary embodiment, each gaming device is arranged to communicate via a network 12 with a game host 14, and the game host is arranged to manage or facilitate game play.

FIG. 1 shows each of the gaming devices communicating over a respective wireless link 16, 18, 20 with network 12. It should be understood that any of the devices could instead communicate over a landline link with the network. However, to facilitate robust gaming, wireless communication is preferred.

Further, although the game host is shown separately from the gaming devices, it should be understood that the game host function could instead be provided by one of the gaming devices itself. The gaming devices could then interact with each other in a peer-to-peer networked arrangement, rather than (or in addition to) interacting with the game host in a client-server relationship.

a. Gaming Devices

In the exemplary embodiment, each gaming device is arranged to take pictures, to communicate over network 12, and to interface with a user, so as to facilitate gaming in the manner presently described. As such, each gaming device could take various forms and could, in fact, comprise multiple devices working in combination. Further, the participating gaming devices could vary in form from one another.

In a preferred arrangement, for instance, each gaming device may comprised a cameraphone, which those skilled in the art will understand to be a mobile telephone that includes an embedded or attached camera. Cameraphones have recently gained widespread acceptance, and technology exists to facilitate wireless transmission of photos (digital image files) to and from cameraphones. Consequently, cameraphones are ideally suited to act as gaming devices in the present invention.

As another example, a gaming device could comprise a personal digital assistant (PDA) such as a Palm® or Pocket-PC® handheld device, equipped with image-capture and network communication technology. And as another example, a gaming device could comprise a digital camera that is equipped with a network communication interface, such as a cellular wireless chipset for instance. And as still another example, a gaming device could comprise a notebook computer coupled with a digital camera. Other examples of gaming devices, now known or later developed, are possible as well.

Figure 2:
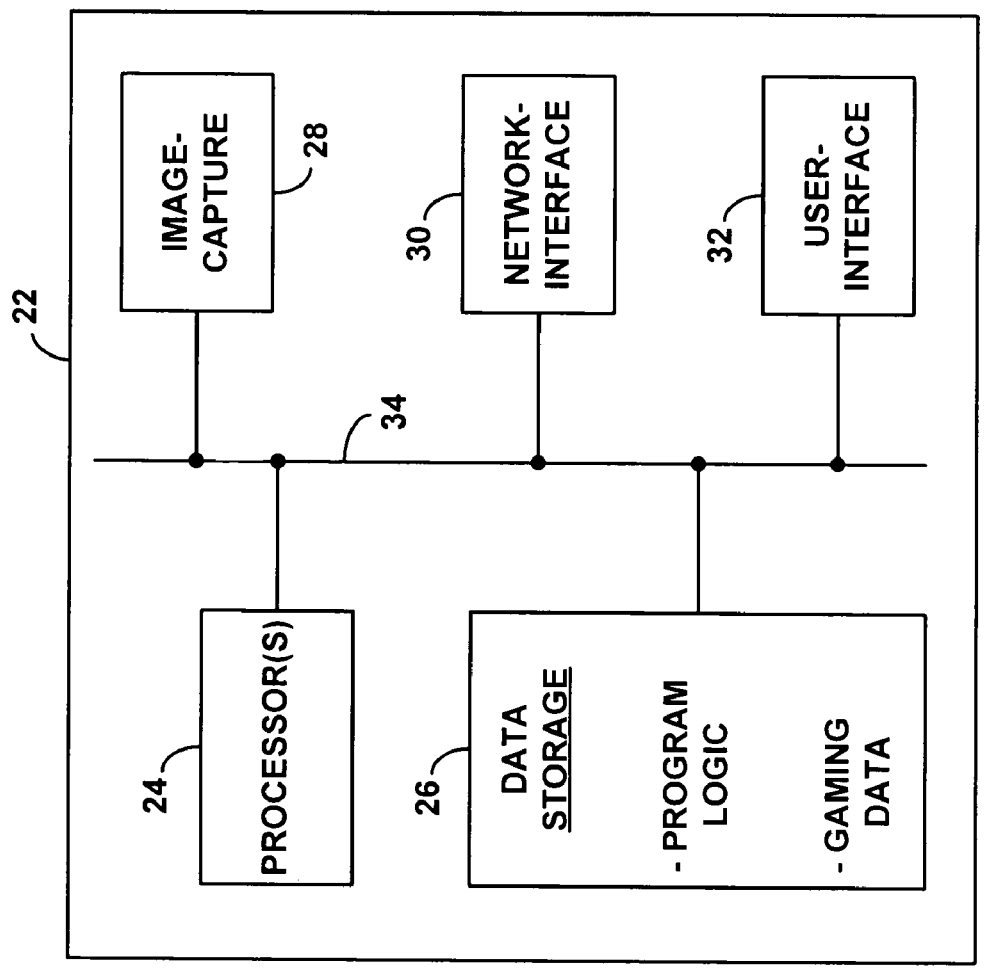
FIG. 2 is block diagram of an exemplary gaming device.

FIG. 2 is a simplified block diagram of a representative gaming device 22, showing functional components that the device could include in accordance with the exemplary embodiment. As shown, the gaming device 22 includes a processing segment 24, a data storage 26, an image-capturing segment 28, a network-interface segment 30, and a user-interface segment 32, all of which may be coupled together by a system bus or other mechanism 34.

In the exemplary embodiment, the processing segment 24 preferably comprises one or more programmable general purpose processors, such as an Intel® Centrino™ processor for instance. However, the processing segment 24 could also or instead comprise one or more specialized processors, such as application specific integrated circuits (ASICs) for instance.

Data storage 26, in turn, may comprise volatile and/or non-volatile storage (such as Flash memory, for instance) and could be integrated in whole or in part with processor segment 24. Data storage 26 preferably holds program instructions executable by processing segment 24 to carry out various functions described herein. (Alternatively, the functions could be carried out in other ways, such as by firmware and/or by hardware for instance.) Further, data storage 26 functions to hold gaming data, such as photos and player information for instance.

Image-capturing segment 28 functions to capture an image of a subject. As such, the image-capturing segment 28 will preferably include features (not shown) that are commonly found in a digital camera, such as a lens for receiving light that defines the image, a flash for illuminating the scene being photographed, and a mechanism to establish a digital representation of the image. The mechanism may include a CCD or CMOS image sensor array, for instance, which resolves the light into pixels, and a digitizer that establishes digital representations of the pixels. The image-capturing segment 28 may then work cooperatively with the processing segment 24, passing an array of the digital pixel representations to the processing segment for storage in a digital image file, and for other handling.

Network-interface segment 30 functions to facilitate communication via network 12 (of FIG. 1) with other entities, such as game host 14, for instance. As such, network-interface segment 30 can take various forms, depending on the manner of communication. By way of example, if gaming device 22 will engage in cellular wireless communication, network-interface segment 30 may comprise a cellular communication chipset such as a Qualcomm MSM® chipset for instance, as well as an antenna. Such a chipset would be arranged to communicate over an air interface according to an agreed protocol, such as CDMA, TDMA, GSM, 802.11 or Bluetooth, for instance, in a manner well known in the art. As another example, if gaming device 22 will engage in IP communication over network 12 with an entity such as game host 14, network-interface segment 30 would preferably include an IP stack. Similarly, if gaming device 22 will engage in other sorts of communication, network-interface segment 30 will be arranged to facilitate the communication. Note that some functions of network interface 30 could be carried out by processing segment 24, e.g., as program logic.

User-interface segment 32, in turn, functions to facilitate interaction with the player operating the gaming device. In the exemplary embodiment, the user-interface segment 32 will include a display screen (e.g., an LCD screen) for presenting digital images and for presenting text-based and/or graphics-based menus or prompts. Further, user-interface segment 32 preferably includes one or more input mechanisms, such as buttons or a touch-sensitive display. The user-interface segment 32 could include other components as well.

In the exemplary embodiment, each gaming device is identified by a unique device identifier, which could take various forms. For example, the device identifier could be a network access identifier (NAI), as defined by well known RFC 2486, or a mobile identification number (MIN). Further, each player operating a gaming device preferably has a player name, which could be the player's actual name or a nickname to be used in gaming. In representative gaming device 22, the device identifier and player name may be stored in data storage 26. Alternatively, the player could enter a player name when registering to play in a given game.

b. Network

Network 12 in FIG. 1 can also take various forms. In the exemplary embodiment, for instance, network 12 will include a public or private packet-switched network, such as the Internet or a core network operated by a telecommunications carrier. Each entity that communicates over the network, such as devices A, B and C, and game host 14, could be assigned a respective network address, such as an IP address for instance. Network 12 could also include circuit-switched components, although a packet-switched arrangement preferred.

Further, network 12 can comprise multiple networks. For instance, network 12 can comprise an access network and a transport network. In an exemplary arrangement as illustrated in FIG. 3, for example, the access network could be a radio access network 40, such as a cellular communication system, and the transport network could be a packet-switched network 42.

Figure 3:
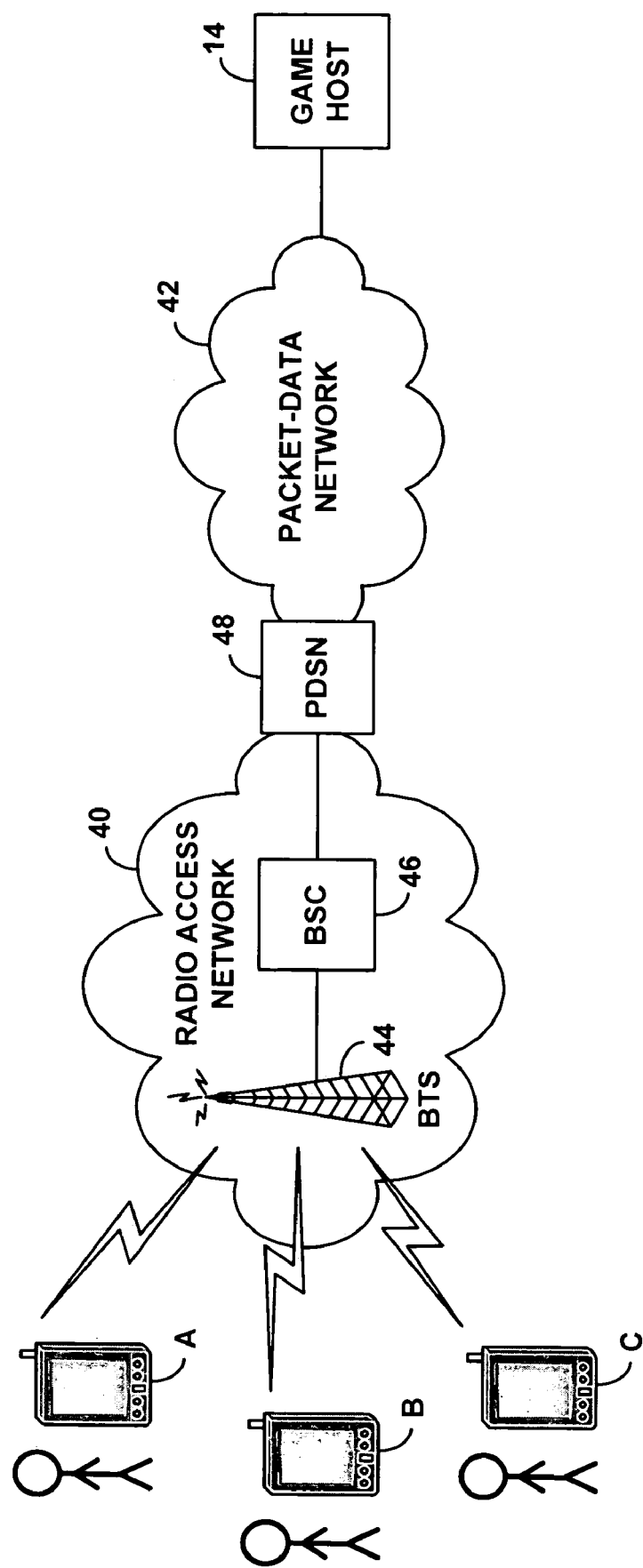
FIG. 3 is a block diagram of a system in which gaming devices communicate via a radio access network.

As shown in FIG. 3, an exemplary radio access 40 network may include a base transceiver station (BTS) 44 that radiates to define a coverage area in which gaming devices can operate and can include a base station controller (BSC) 46 that governs operation of the BTS 44. The BSC 46 may then be couple with a gateway, such as a packet data serving node (PDSN) 48, that provides connectivity with the packet-data network 42, and game host 14 may sit on the packet-data network 42. Through well known procedures, each of the gaming devices may then acquire a radio link layer connection with BTS 44, a data link layer connection with the PDSN 48, and a network layer connection with packet-data network 42, so as to be able to communicate with game host 14.

Note that in an alternative arrangement, multiple radio access networks could serve the gaming devices. For instance, gaming device A could be served by one radio access network that provides connectivity with packet-data network 42, while gaming devices B and C could be served by another radio access network that provides connectivity with packet-data network 42. Other network arrangements are also possible.

c. Game Host

In the exemplary embodiment, game host 14 will function to manage and facilitate game play among the gaming devices. As such, the game host will preferably maintain gaming data, such as participant-data and game status information, and the game host will function to exchange photos and signaling information with the gaming devices.

Figure 4:
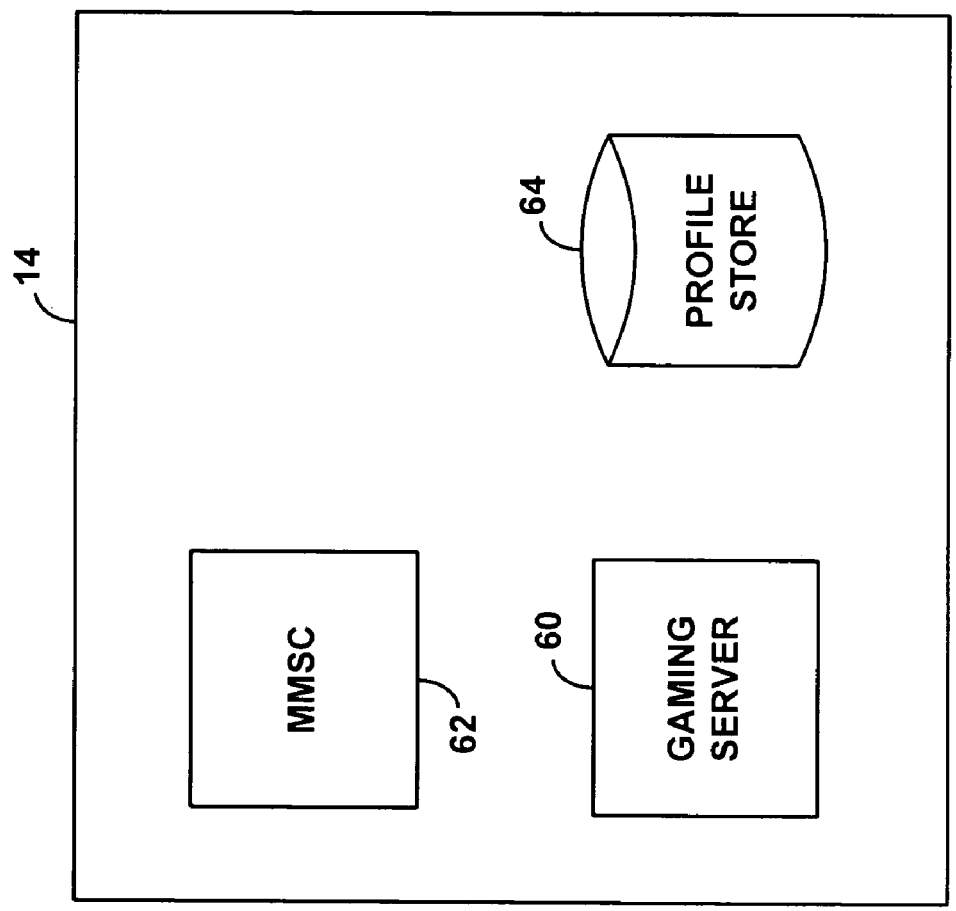
FIG. 4 is a block diagram of an exemplary game host.
Figure 5:
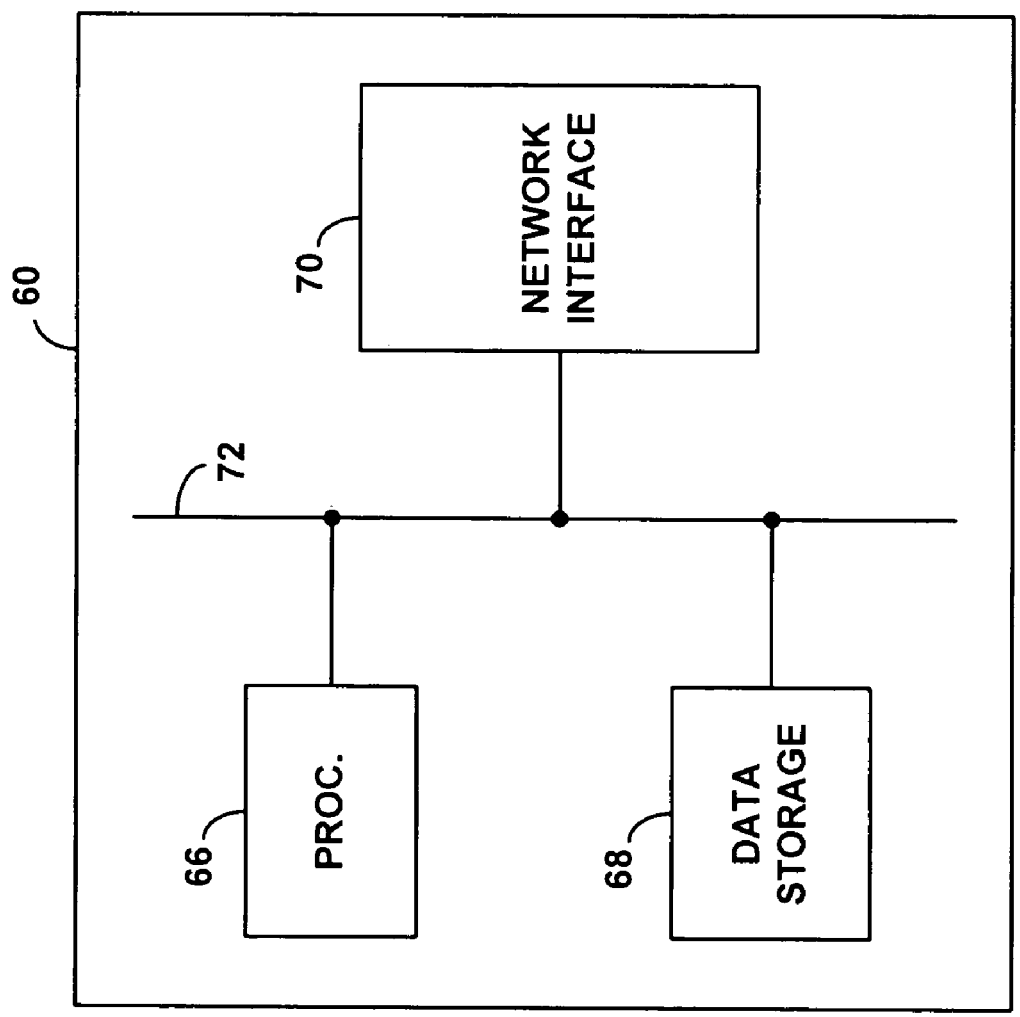
FIG. 5 is a block diagram of an exemplary gaming server.

FIG. 4 is a simplified block diagram depicting components of an exemplary game host 14. As shown in FIG. 4, the game host 14 includes a gaming server 60, a multimedia messaging service center (MMSC) 62, and a profile store 64, each of which could sit at a respective address on network 12. (Although FIG. 4 depicts these components within a box, the components may or may not be located in a common entity on network 12.)

In the exemplary embodiment, gaming server 60 will be the core intelligence of the game host 14. As such, gaming server 60 will function to manage participant-data, to send and receive photos and other gaming data, and to otherwise manage and facilitate game play. To carry out these functions, as shown in FIG. 3, gaming server 60 preferably includes a processing segment 66, data storage 68 and a network-interface segment 70, which may be coupled together by a system bus or other mechanism 72.

Processing segment 66 may comprise one or more general purpose processors and/or dedicated processors. And data storage 68 may comprise volatile and/or non-volatile memory, which could be integrated in whole or in part with processing segment 66. Data storage 68 preferably holds program instructions executable by processing segment 66 to carry out various functions described herein. (Alternatively, the functions could be carried out in other ways, such as by firmware and/or by hardware.) Further, data storage 68 may hold gaming data, such as participant-data, photos and game status information.

In the exemplary embodiment, gaming server 60 may communicate with the gaming devices according to any agreed protocol, whether proprietary or standard. For instance, the gaming devices and gaming server 60 could communicate according to HTTP. In particular, each gaming device could include an HTTP client application, such as a web browser, and the gaming server could include an HTTP server application. The HTTP clients could then interact with the HTTP server through conventional HTTP messaging.

Further, if the gaming devices are wireless mobile devices (such as cameraphones for instance), the gaming server can exchange photos and other data (e.g., signaling information) with the gaming devices through the MMSC 62, using the well known multimedia messaging service (MMS) protocol.

According to MMS, a mobile device can send data to another entity by sending an HTTP POST message (via a WAP gateway for instance) to an MMSC, including in the message an IP address or other identifier of the destination. The MMSC would then forward the data to that destination. On the other hand, a network entity can send data to a mobile device by sending an MMS message to the MMSC, including in the MMS message an identifier of the mobile device (e.g., an NAI or MIN for instance). The MMSC would then store the data under an assigned message number and send the message number to the mobile device in a specially coded SMS message. Upon receipt of the specially-coded SMS message, the mobile device would then send an HTTP request to the MMSC, requesting the data stored under that message number, and the MMSC would provide the data in an HTTP response message.

In the exemplary embodiment, gaming server 60 will also be arranged to facilitate game setup, by configuring gaming devices with applicable gaming logic and registering participants to play. In particular, gaming server 60 may maintain in data storage 68 a client application that a gaming device will run in order to participate in the game, and gaming server 60 may host a game-setup web site through which gaming devices can download the application and players can register to participate in a game. Further, gaming server 60 may refer to profile store 64 to validate players who seek to join a game, and to determine relevant device capabilities (e.g., so as to send a proper version of the client application).

Still further, the gaming server 60 can be arranged to monitor participation in a given game and to remove inactive participants from the game. For instance, gaming server 60 could be arranged to send periodic keepalive messages (e.g., PING or SIP messages) to participants during a game and to remove from the game any participating device that does not respond to a threshold number of keepalive messages or within a threshold period of time.

2. Exemplary Operation

As noted above, the present invention can facilitate various interactive games, each involving user ratification of a photo captured by another user. By way of example, the following sections will describe operation of several games, including (a) picture-tag with single-user ratification, (b) picture-tag with third party ratification, and (c) scavenger hunt. It should be understood that other games are possible as well.

a. Picture-Tag with Single-User Ratification

In a basic picture-tag game as presently contemplated, the player designated as IT will capture a photo of another player, and IT's gaming device will send the photo to the game host, which will then distribute the photo to the participating devices to be displayed to the players. The player who sees his photo displayed will then enter an acknowledgement that he has been tagged, and his gaming device will send the acknowledgement to the game host. The game host will then notify the participants that that player has become the new "IT," and play will continue.

i. Game Initiation

In the exemplary embodiment, the process begins by initiating the picture-tag game and establishing game participants, such as players A, B and C as shown in FIG. 1.

As presently contemplated, one of the players will initiate the game by sending a game setup signal to the game host 14. A player may do this by interacting with the game-setup web site through a web browsing session. For example, player A may engage in a web browsing session on gaming device A, to browse to the game-setup site and select a "play picture-tag" link. This may cause device A to send an HTTP request message to the gaming server 60, providing as query parameters (i) the NAI, MIN or other identifier of device A, and (ii) the name of player A. (The game-setup site could prompt the player to enter a device ID and player name if necessary.)

In response, the gaming server 60 may consult profile store 64 to validate player A and/or device A and to determine whether device A already has a copy of the picture-tag client application. Further, the gaming server 60 may assign a unique game code for this instance of the game, which can be used by other players to join the game. If gaming server 60 determines that device A does not yet have a copy of the picture-tag application, then it may respond with an HTTP message providing the picture-tag application and the assigned game code. Alternatively, the gaming server may respond with just the game code.

Further, upon initialization of the game, the gaming server 60 will establish a set of gaming data, keyed to the assigned game code. Preferably, the gaming will include participant-data that specifies, for each participant, (i) the player name, (ii) the device ID (e.g., NAI or MIN), and (iii) a flag indicating whether the player is currently designated as IT. To start, the participant-data will list player A as the sole player in the game, absent other arrangements.

Player A may then pass the game code to others, so that they can join in the game. For instance, device A may display the game code, and player A may read it and convey the code to players B and C. Alternatively, player A could cause device A to pass the game code to devices B and C through a local networking technology such as 802.11, Bluetooth, or infrared transmission for instance, and using a messaging method such as instant messaging, short message service, or Shortmail, for instance.

Players B and C may then each use the game code to register in the game. For instance, each player may browse to the game-setup web site, enter the game code, and select a "join picture-tag game" link. The player's device may then send an HTTP message to the gaming server, providing as query parameters (i) the game code, (ii) the player name and (iii) the device ID. Gaming server 60 would then validate the player/device and deliver client application if necessary. Further, gaming server 60 would update the participant-data for the game, to reflect the new player.

Once a player/device registers as a participant in the game, the device will run the picture-tag application. During execution, the picture-tag application will exchange signals with the game host. For instance, the picture-tag application may receive and respond to MMS-based commands from the game host. Further, the application will maintain a record indicating whether its player is currently designated as IT and will behave accordingly.

For example, when the player is currently designated as IT, (i) the application may present cross-hairs in the viewfinder (i.e. superimpose cross-hairs over the image in the viewfinder), so the player knows he is looking to tag others, and (ii) when the device captures a photo, the application may automatically send the photo to the game host. On the other hand, when the player is not designated as IT, (i) the application may present a photo of the player designated as IT, and (ii) when the device receives a photo from the game host, the application may present the photo and present a prompt requesting a user to enter an acknowledgement that the user has been tagged (i.e., that the photo represents the user).

ii. Initial Designation of "IT"

To start the game, the game host 14 may randomly select one of the players to be "IT," and the game host may set up the players' devices accordingly. The game host may do this at the command of the player of who initiated the game, or at some other designated time. For instance, when the initiating player is ready for game play to begin, the player may select a "Start Game" option in the picture-tag application, which would cause the player's device to send a start command to the game host (e.g., in an HTTP message).

Once the game host selects an initial player to be IT, the game host may send to IT's device an MMS message that will cause the picture-tag application to direct the player to take a photo of himself. For instance, the MMS message may cause the application to present a message to the user, stating "You are IT. Please take a picture of yourself to begin." Further, the application may responsively cause the device to ring or vibrate, to alert the player.

Figure 6:
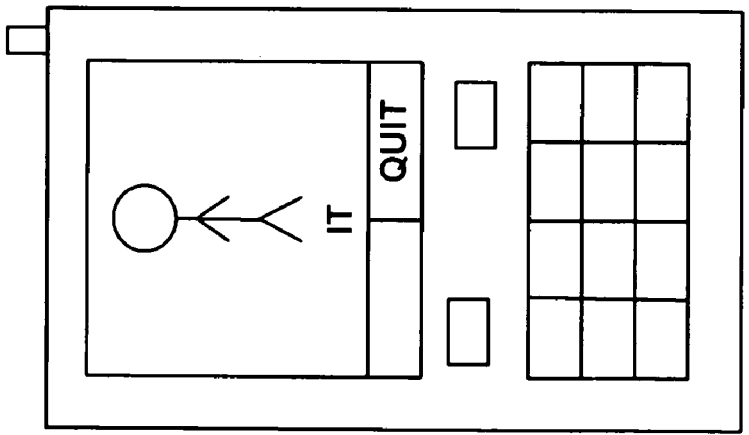

When the player takes a photo of himself, the application on his device will then send the photo to the game host. In turn, the game host will distribute the photo to each other participating device in an MMS message that will cause each recipient device to present the photo with a label such as "IT," so that the other players then know who is out to get them. FIG. 6 shows how such a screen display might appear on an exemplary device.

Figure 7:
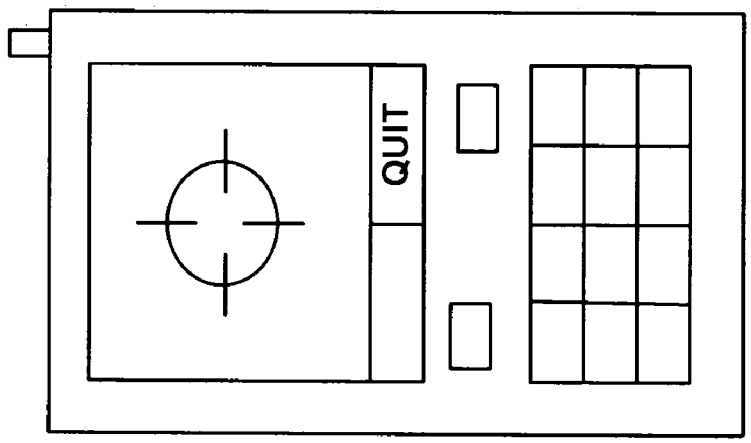

In addition, after the application sends the photo to the game host, the application may present cross-hairs or another indication in a viewfinder, so that the player knows that he is seeking to tag others by taking their picture. FIG. 7 shows how such cross-hairs might appear in an LCD viewfinder of an exemplary device.

Once the devices are configured, the game may then begin.

iii. Game Play

In operation, the player designated as IT will attempt to snap pictures of others. When the IT's device captures a photo during the game, the application on IT's device may display the photo and automatically send the photo to the game host. In response, the game host will then distribute the photo to each other participating device.

Figure 8:
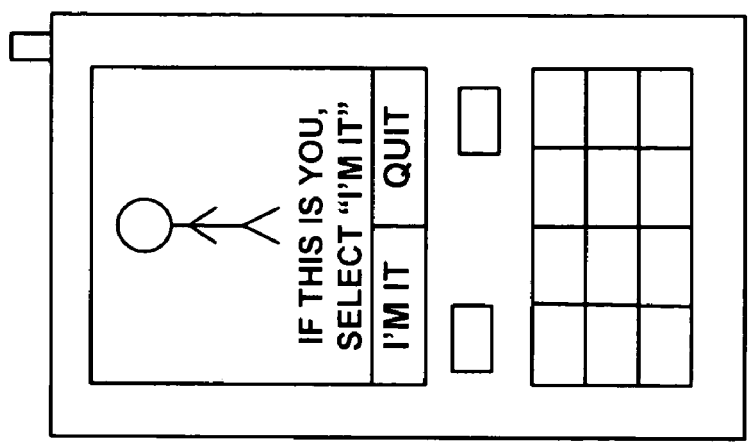
FIGS. 6-11 are illustrations of exemplary gaming device displays.

When a device receives the photo from the game host, the application on the device will responsively present the photo, together with a prompt for a player to acknowledge that the player has been tagged, i.e., that the photo represents the player. For instance, the recipient device may display the photo and prompt the user to engage a soft-button labeled "I'm IT" if the photo represents the user. FIG. 8 shows how such a display and soft-button label might appear on an exemplary device.

Upon viewing the photo, if a player believes the photo represents him, the player may acknowledge that he has been tagged, by engaging the "I'M IT" soft-button. This would cause the application on the player's device to send an acknowledgement signal to the game host, as a ratification that the photo represents the player, i.e., that the player has been tagged.

In response, the game host would update the gaming data to indicate the new player designated as IT, and the game host would signal to the participating devices to indicate who is now designated as IT. In particular, to the device operated by the player newly designated as IT, the game host may send an MMS message that causes the application on the device to present cross-hairs in the viewfinder. And to the devices operated by other players, the game host may send an MMS message that causes the application on each device to add the label "IT" to the photo currently displayed (i.e., the photo of the player newly designated as IT). Each device may then ring or vibrate to reflect the change in state, and play may then continue.

In the exemplary embodiment, if no player acknowledges that he has been tagged within a certain time period, such as 20 seconds, each participating device will revert to its last state. That is, IT's device will revert to display cross-hairs, and each other device will revert to display the photo of IT.

Figure 12:
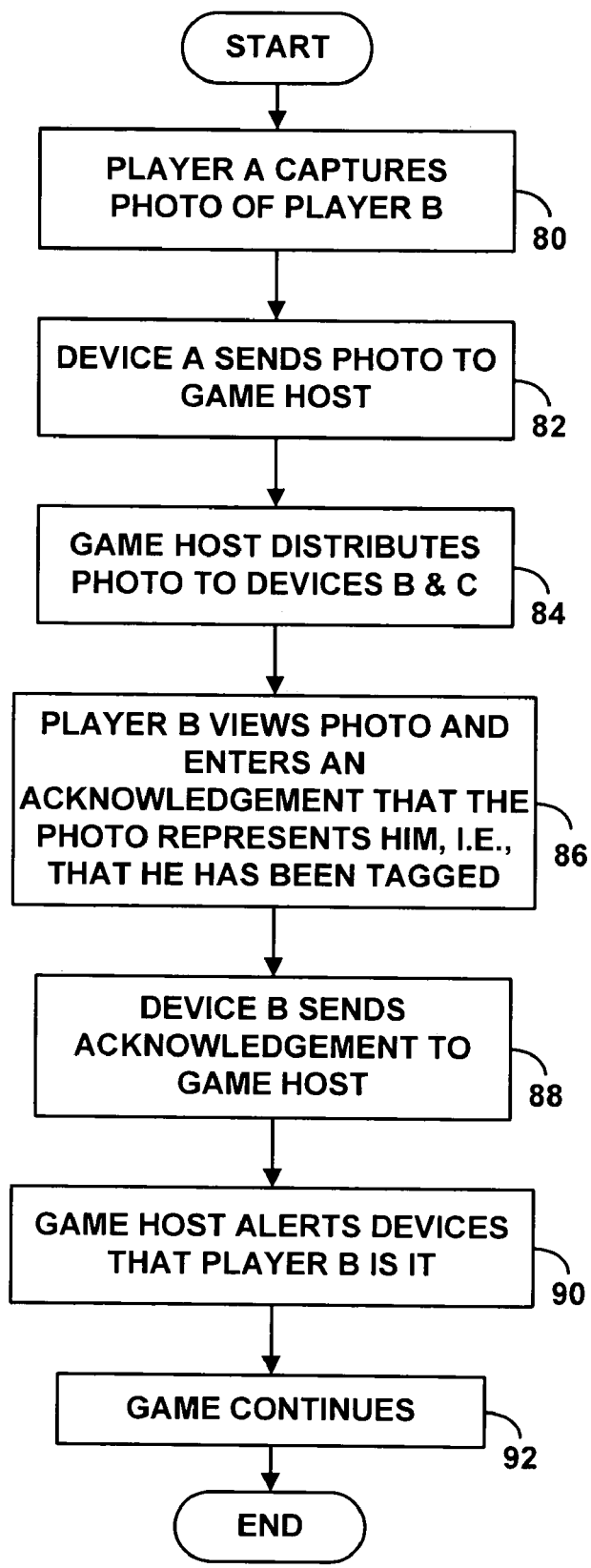
FIGS. 12 and 13 are flow charts depicting functions that can be carried out in accordance with the exemplary embodiment.

FIG. 12 is a flow chart depicting this process generally, where device A is first designated as IT. As shown in FIG. 12, at block 80, player A captures a photo of player B. At block 82, device A responsively sends the photo to the game host. And at block 84, the game host distributes the photo to devices B and C. At block 86, player B then enters an acknowledgement that the photo represents him. And at block 88, device B sends the acknowledgement to the game host. At block 90, the game host then signals to the devices to alert them that player B is now IT. At block 92, the game would then continue, with player B capturing a photo of player A or player C, who would then become IT in the same manner.

b. Picture-Tag with Third-Party Ratification

As a variation on the basic picture-tag game described above, the game can be arranged to allow players to ratify that other players were tagged. In this variation, when IT captures a photo, each other player's device will present the photo and prompt a user to indicate which of the participating players (if any) the photo represents, and will send a signal to the game host indicating which player the photo represents. Based on these signals from one or more of the participating devices, the game host would designate a new player as IT.

In order to support this game, in the exemplary embodiment, the application on each gaming device will receive a list of participating players, so that the application can prompt a player to select from that list. In one arrangement, the game host could provide this list to the device in an MMS message upon initiation of the game, and the application can store the list for later use. In another arrangement, the game host could provide this list to the device at the time the game host sends a photo to the device. (The latter arrangement can preferably account for change in participation during the game.)

Thus, in operation, when the player designated as IT captures a photo during the game, the application on IT's device may display the photo and automatically send the photo to the game host. In response, the game host may then send the photo to each other device, together with an instruction directing the device to prompt for user identification of the player in the photo. The instruction could include a list of participating player names.

Figure 9:
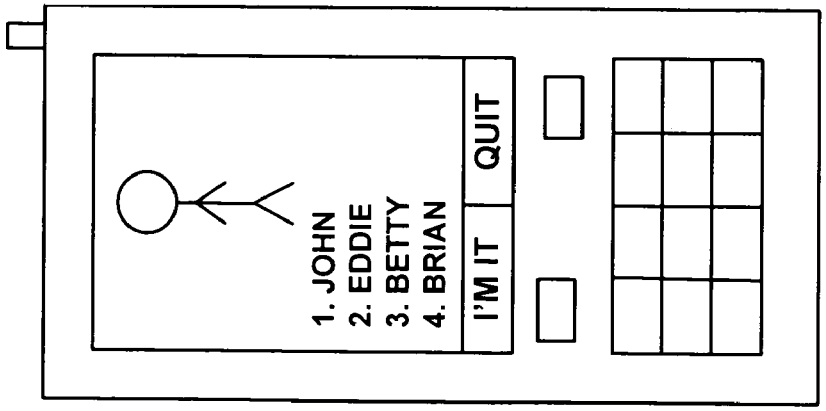

When a device receives the photo and instruction from the game host, the application on the device will responsively present the photo, together with a prompt for a player to identify the player represented in the photo. For instance, the application may present the photo followed by the list of the participating player names. In the exemplary embodiment, the list will omit the player who is operating the device; in place of that player's name, the application may present an "I'm IT" soft-button, which the player could engage in order to acknowledge that he has been tagged. (Alternatively, the list could include the player's name as well.) FIG. 9 shows how such a display may appear on an exemplary device.

Upon viewing the photo, a player may then select from the list the name of the player (if any) who is shown in the photo, such as by pressing a numeric keypad button corresponding to the entry in the list. This would cause the application on the player's device to send a signal to the game host, indicating who the player believes the photo represents.

Upon receipt of such signals from some or all of the players, or after a predefined period expires, the game host may then tabulate the "votes" to determine who the players feel was tagged. The game host may then update the gaming data to indicate that that player is now designated as IT, and the game host would signal to the participating devices to indicate who is now designated as IT.

Figure 13:
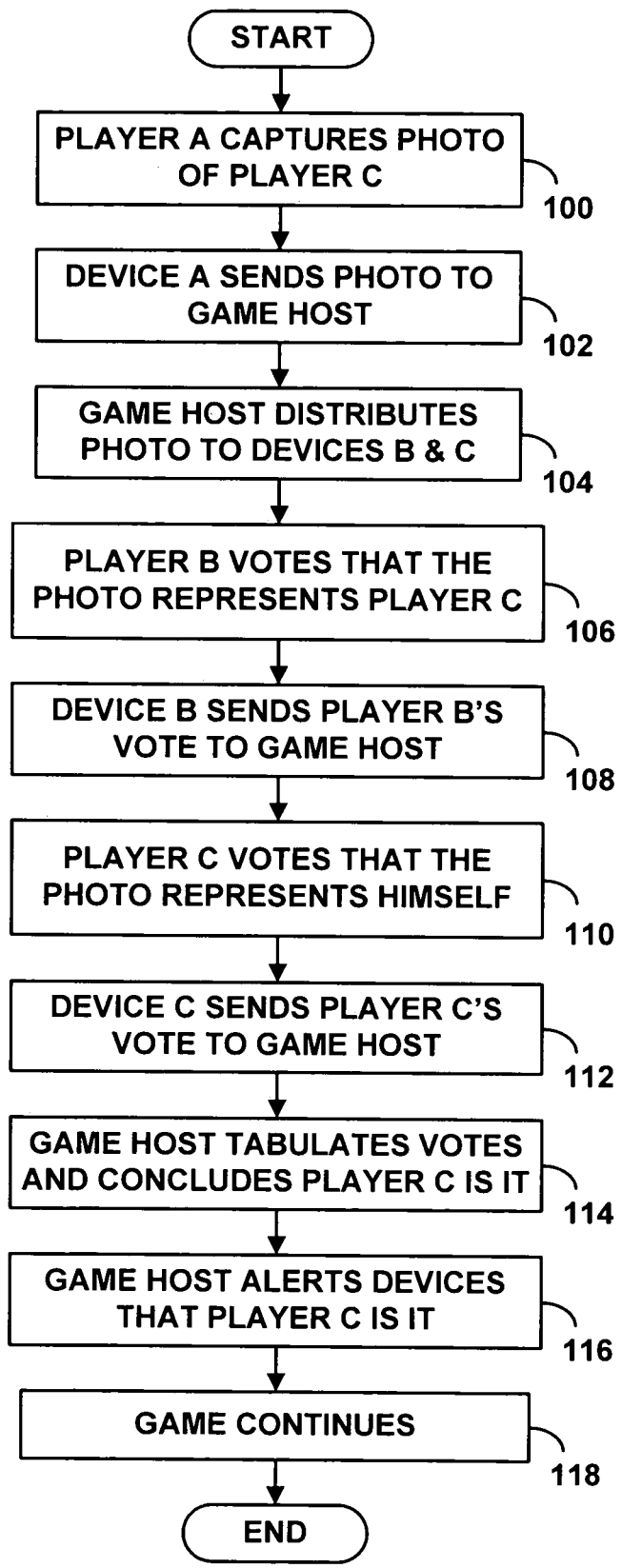

FIG. 13 is a flow chart depicting this process generally, again where device A is first designated as IT. As shown in FIG. 12, at block 100, player A captures a photo of player C. At block 102, device A responsively sends the photo to the game host. And at block 104, the game host distributes the photo to devices B and C. At block 106, player B then enters a vote that the photo represents player C, and, at block 108, device B sends the vote to the game host. Further, at block 110, player C enters a vote that the photo represents himself, and, at block 112, device C sends the vote to the game host. At block 114, the game host tabulates the votes, and concludes that player C is now IT. Thus, at block 116, the game host signals to the devices to alert them that player C is now IT. And at block 118, the game would continue.

c. Scavenger Hunt

Figure 10:
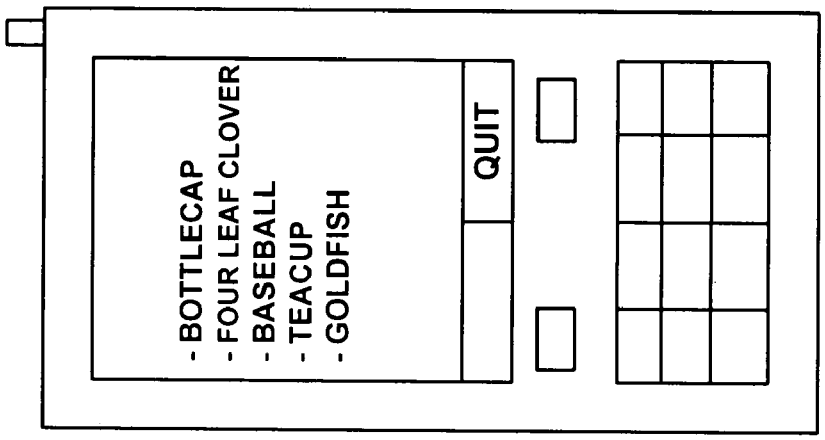

In a scavenger hunt, a game host may maintain a record for a given game of a set of items that the players are to find, and the game host may send a list of the items to the player's devices at the start of the game. Each device may thus display the list of items to be found, as shown in FIG. 10 for instance.

When a player finds an item, the player would capture a photo of the item, which would cause a game application on the player's device to send the photo to the game host. In response, the game host may then send the photo to each participating device, together with an instruction directing the device to prompt for user identification of the item in the photo. The instruction could include a list of the items remaining to be found.

Figure 11:
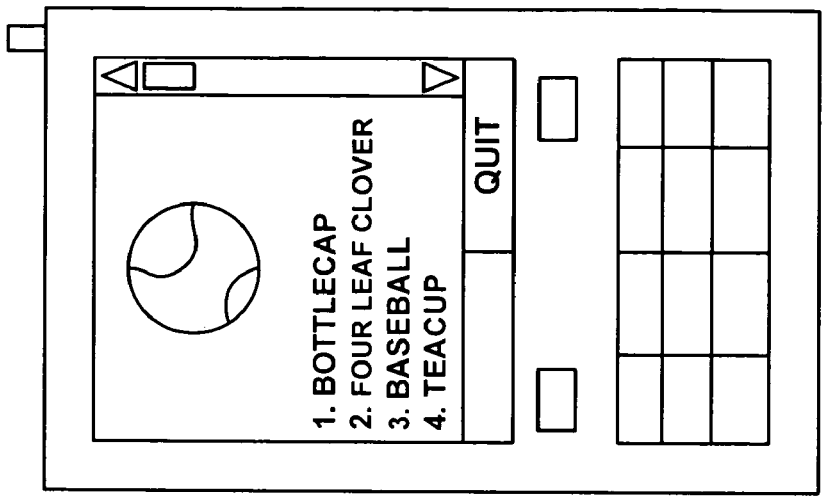

When a device receives the photo and instruction from the game host, the application on the device will responsively present the photo, together with a prompt for a player to identify the item shown by the photo. For instance, the application may present the photo followed by the list of the items remaining to be found. FIG. 11 shows how such a display may appear on an exemplary device.

Upon viewing the photo, a player may then select from the list the item (if any) that is shown in the photo, such as by pressing a numeric keypad button corresponding to the entry in the list. This would cause the application on the player's device to send a signal to the game host, indicating what item the player believes the photo represents. Further, the application may allow a player to vote that the item shown is "not relevant" or to otherwise vote that the item is not one of those remaining to be found.

Upon receipt of such signals from some or all of the players, or after a predefined period expires, the game host may then tabulate the "votes" to determine what item the player's feel was found. The game host may then flag that item as found, and the game host may signal to the participating devices to cause the devices to flag the item as found. Play may then continue, until all of the items are found.

In an exemplary arrangement, the scavenger hunt game could be played in teams, with the game host maintaining participant-data and a list of items remaining to be found by each team. In this arrangement, the first team to find all of the items would be declared the winner.

3. Conclusion

An exemplary embodiment of the present invention has been described above. Those skilled in the art will understand, however, that changes and modifications may be made to the embodiment described without departing from the true scope and spirit of the invention, which is defined by the claims.

What is claimed is:

1. A portable device comprising:
 a network interface;
 a display screen;
 a processing unit;
 data storage; and
 machine language instructions stored in the data storage and executable by the processing unit to allow a user of the device to participate in a picture-tag game, wherein the instructions include (i) instructions for receiving a digital image from a game host via the network interface and prompting the user to enter an acknowledgement that the digital image represents the user and (ii) instructions for transmitting the acknowledgement to the game host via the network interface.

2. The portable device of claim 1, wherein the network interface is a wireless communication interface arranged to communicate over an air interface.

3. The portable device of claim 1, wherein the portable device is a cameraphone.

4. The portable device of claim 1, wherein the portable device comprises a device selected from the group consisting of a personal digital assistant (PDA), a camera, and a personal computer.

5. A game host configured to manage a picture-tag game among a plurality of users, each user operating a respective digital camera with a wireless network interface, wherein, in the picture-tag game, one of the users at a time is a designated user ("IT") and the designated user attempts to tag any other user by capturing a photo of the other user, the game host comprising:
 at least one processor;
 data storage;
 participant-data stored in the data storage, the participant-data representing the users' cameras;
 program logic stored in the data storage and executable by the at least one processor (i) to receive from the designated user's camera a photo that the designated user captured of a given one of the users, (ii) to send the photo to at least the given user's camera, (iii) to receive from at least the given user's camera an acknowledgement that the given user has been tagged and has therefore become the designated user, and (iv) to notify the users who is the designated user.

6. A method comprising:
 maintaining in a game host a record of a plurality of cameras that are participating in a picture-tag game, the plurality of cameras including at least a first camera, a second camera and a third camera;
 receiving into the game host from the first camera a first photo that the first camera captured of a user of the second camera;
 sending the first photo from the game host to at least the second camera;
 receiving into the game host, from at least the second camera, a ratification that the user of the second camera has been tagged;
 receiving into the game host from the second camera a second photo that the second camera captured of a user of the third camera;
 sending the second photo from the game host to at least the third camera; and
 receiving into the game host, from at least the third camera, a ratification that the user of the third camera has been tagged.

7. The method of claim 6, wherein sending the photo from the game host to at least the second camera comprises:
 sending the photo from the game host to the plurality of cameras that are participating in the picture-tag game.

8. The method of claim 6, wherein sending the photo from the game host to at least the third camera comprises:
 sending the photo from the game host to the plurality of cameras that are participating in the picture-tag game.

9. The method of claim 6, wherein receiving from at least the second camera the ratification that the user of the second camera has been tagged comprises:
 receiving, from multiple cameras participating in the picture-tag game, the ratification that the user of the second camera has been tagged.

10. The method of claim 6, further comprising:
 wherein receiving from at least the third camera the ratification that the user of the third camera has been tagged comprises:
 receiving, from multiple cameras participating in the picture-tag game, the ratification that the user of the third camera has been tagged.

11. The method of claim 6, further comprising:
 responsive to receiving the ratification that the user of the second camera has been tagged, sending to multiple cameras participating in the picture-tag game a signal indicating that the user of the second camera has been tagged.

12. The method of claim 11, further comprising:
 receiving the signal into the second camera; and
 responsively displaying crosshairs on a viewfinder of the second camera.

13. The method of claim 11, wherein the signal comprises the first photo.

14. The method of claim 13, further comprising:
 receiving the signal into the multiple cameras; and
 displaying the first photo on a display screen of each camera that receives the signal, to indicate who has been tagged.

15. The method of claim 6, further comprising:
responsive to receiving the ratification that the user of the third camera has been tagged, sending to multiple cameras participating in the picture-tag game a signal indicating that the user of the third camera has been tagged.

16. The method of claim 15, further comprising:
receiving the signal into the third camera; and
responsively displaying crosshairs on a viewfinder of the third camera.

17. The method of claim 15, wherein the signal comprises the second photo.

18. The method of claim 17, further comprising:
receiving the signal into the multiple cameras; and
displaying the first photo on a display screen of each camera that receives the signal, to indicate who has been tagged.

19. The method of claim 6, wherein at least one of the first, second and third cameras comprises a cameraphone.

20. The method of claim 6, wherein at least one of the first, second and third cameras comprises a device selected from the group consisting of (i) a personal digital assistant (PDA) equipped with image-capture technology and (ii) a notebook computer coupled with a digital camera.

21. The method of claim 6, further comprising, at a start of the picture-tag game:
randomly selecting a user of the first camera; and
then sending to multiple cameras participating in the picture-tag game a signal indicative of the user of the first camera.

22. The method of claim 21, further comprising:
receiving the signal into the first camera; and
responsively displaying crosshairs in a viewfinder of the first camera.

23. A method comprising:
maintaining in a gaming server a record of a plurality of cameras that are participating in a game, the plurality of cameras including a first camera and one or more others cameras;
receiving into the gaming server from the first camera a photo that the first camera captured of a subject;
sending the photo from the gaming server to the one or more other cameras; and
then receiving, from at least one of the one or more other cameras, a ratification that the photo of the subject has been captured.

24. The method of claim 23, wherein the subject comprises a user of one of the one or more other cameras.

25. The method of claim 23, wherein receiving the ratification that the photo of the subject has been captured comprises receiving a ratification that the photo represents the subject.

26. The method of claim 23, wherein the one or more other cameras is multiple cameras.

27. The method of claim 23, wherein the game comprises a scavenger hunt.

28. The method of claim 23, wherein the game comprises tag.

29. The method of claim 23, wherein at least one of the cameras comprises a cameraphone.

30. The method of claim 23, wherein at least one of the cameras comprises a device selected from the group consisting of (i) a personal digital assistant (PDA) equipped with image-capture technology and (ii) a notebook computer coupled with a digital camera.

31. A gaming system comprising:
at least one processor;
data storage;
participant-data stored in the data storage and indicating multiple game participants; and
gaming logic stored in the data storage and executable by the at least one processor to carry out functions comprising, in order:
(i) receiving, from a first participant, a photo that the first participant captured of a subject,
(ii) sending the photo to one or more of the participants, and
(iii) receiving from at least one of the one or more participants a ratification that the photo of the subject has been captured.

* * * * *